United States Patent [19]

Takamoro

[11] Patent Number: 5,708,351
[45] Date of Patent: Jan. 13, 1998

[54] BATTERY PACK WITH A LITHIUM ION SECONDARY BATTERY

[75] Inventor: Kenji Takamoro, Tokyo, Japan

[73] Assignee: NEC Corporation, Tokyo, Japan

[21] Appl. No.: 699,953

[22] Filed: Aug. 20, 1996

[30] Foreign Application Priority Data

Aug. 25, 1995 [JP] Japan ................................. 7-217129

[51] Int. Cl.⁶ ................................................. H01M 10/46
[52] U.S. Cl. ................................................ 320/3 J; 320/49
[58] Field of Search ............................ 320/2, 5, 15, 32, 320/35, 39, 49, 50

[56] References Cited

U.S. PATENT DOCUMENTS

| | | | |
|---|---|---|---|
| 5,477,130 | 12/1995 | Hashimoto et al. | 320/49 |
| 5,493,197 | 2/1996 | Eguchi et al. | 320/5 |
| 5,510,690 | 4/1996 | Tanaka et al. | 320/2 |
| 5,572,108 | 11/1996 | Windes | 320/1 |

FOREIGN PATENT DOCUMENTS

| | | |
|---|---|---|
| 58-225368 | 12/1983 | Japan . |
| 62-223680 | 10/1987 | Japan . |
| 2-133038 | 5/1990 | Japan . |
| 3-180784 | 8/1991 | Japan . |
| 4-127620 | 4/1992 | Japan . |

*Primary Examiner*—Edward Tso
*Attorney, Agent, or Firm*—Sughrue, Mion, Zinn, Macpeak & Seas, PLLC

[57] ABSTRACT

A battery pack of the present invention and uses a lithium ion secondary battery and is capable of adjusting the output voltage when temperature around the battery pack is low and causes the voltage of the secondary battery to drop. Therefore, the battery pack outputs a constant voltage on its output terminal without regard to the ambient atmospheric temperature.

6 Claims, 3 Drawing Sheets

BATTERY PACK WITH A LITHIUM ION SECONDARY BATTERY

BACKGROUND OF THE INVENTION

The present invention relates to a battery pack for use with a portable apparatus and, more particularly, to a battery pack using a lithium ion secondary battery and operable with a constant discharge characteristic without regard to the ambient atmospheric temperature.

Many portable apparatuses are powered by Ni—Cd (nickel-cadmium) secondary battery packs. An Ni—Cd battery has a discharge characteristic, i.e., battery capacity and terminal voltage little susceptible to the ambient atmospheric temperature. However, for the small size, light weight configuration of a portable apparatus, it is necessary to reduce the size and weight of a battery pack while increasing the capacity of the same. Particularly, for portable phones, a 3 V power source voltage is currently replacing 5 V power source voltage. In this respect, a lithium ion secondary battery is advantageous over the Ni—Cd battery or an Ni—Mn (nickel-manganese) battery.

However, a lithium ion secondary battery susceptible to the ambient atmospheric temperature, i.e., its terminal voltage noticeably drops at low temperature. Therefore, the output voltage of a battery pack using a lithium ion battery drops at low temperatures. As a result, a portable apparatus loaded with such a battery pack cannot be powered by a constant voltage.

Technologies relating to a battery for use in a portable apparatus are disclosed in, e.g., Japanese Patent Laid-Open Publication Nos. 4-127620, 2-133038, 58-225368, 62-223680, and 3-180784. None of them, however, teaches an implementation for coping with the drop of the output voltage of a lithium ion secondary battery at low temperatures.

SUMMARY OF THE INVENTION

It is therefore an object of the present invention to provide a battery pack using a lithium ion secondary battery and capable of outputting a constant voltage even when the ambient atmospheric temperature is low.

A battery pack using a lithium ion secondary battery of the present invention has a protection circuit consisting of an overdischarge protecting circuit, an overcharge protecting circuit, and an overcurrent protecting circuit. A temperature sensing circuit consists of a temperature non-linear element, a current detector, and a voltage detector. A controller controls a boosting ratio in response to the output of the temperature sensing circuit. A boosting circuit boosts the output voltage of the lithium ion secondary battery in response to a control signal output from the controller.

BRIEF DESCRIPTION OF THE DRAWINGS

The above and other objects, features and advantages of the present invention will become apparent from the following detailed description taken with the accompanying drawings in which.

DESCRIPTION OF THE PREFERRED EMBODIMENT

To better understand the present invention, a brief reference will be made to a conventional battery pack for a portable apparatus, particularly a portable phone. As shown, the battery pack has an Ni—Cd secondary battery 71 by way of example. A PCT (Positive Temperature Coefficient) device 72 is a protective device against overcurrent. A thermistor 73 is responsive to temperature elevation occurring when the battery 71 is charged. A diode 74 has a charge terminal and a discharge terminal separate from each other in order to obviate discharge toward the charge terminal. The Ni—Cd battery 71 has a discharge characteristic, i.e., battery capacity and terminal voltage which are not susceptible to the ambient atmospheric temperature. However, a lithium ion secondary battery is advantageous over the Ni—Cd battery 71 because of the small size, light weight configuration of the portable apparatus, as stated earlier.

Figure 1:
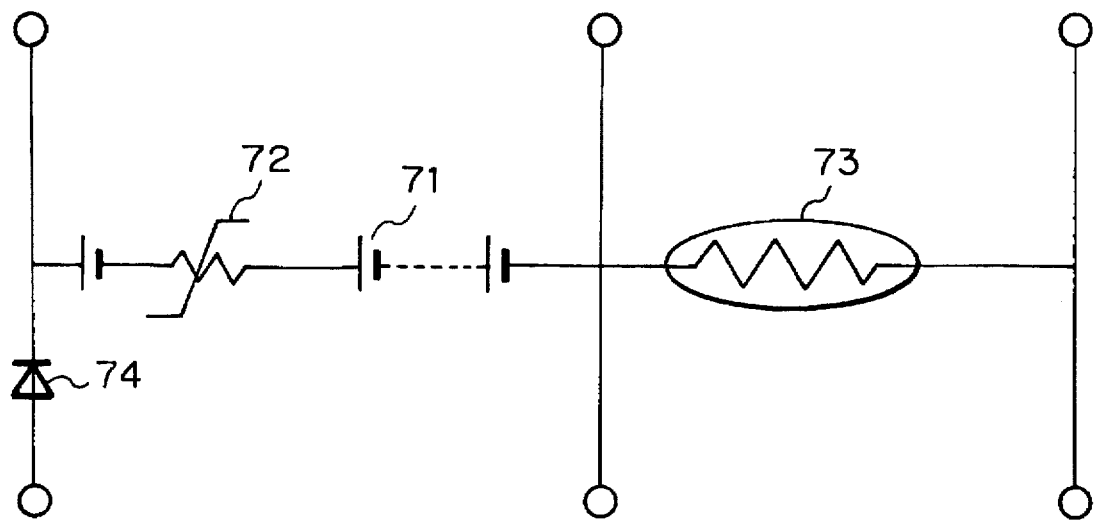
FIG. 1 is a block diagram schematically showing a conventional battery pack using an Ni—Cd secondary battery.
Figure 2:
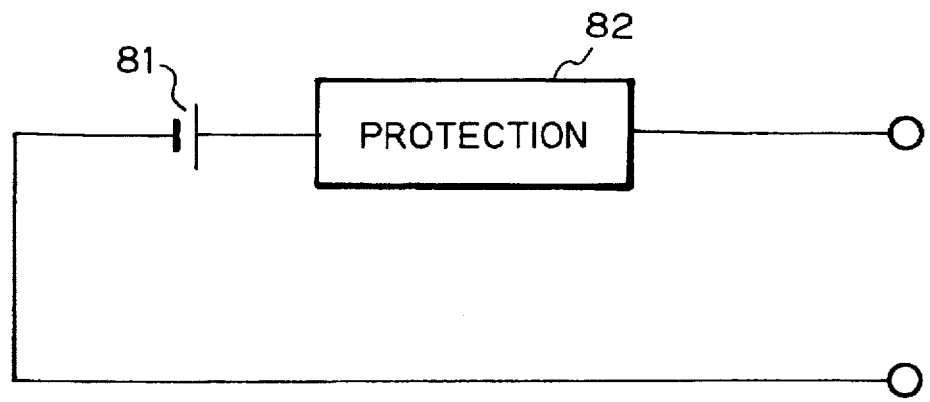
FIG. 2 is a block diagram schematically showing another conventional battery pack using a lithium ion secondary battery.
Figure 3:
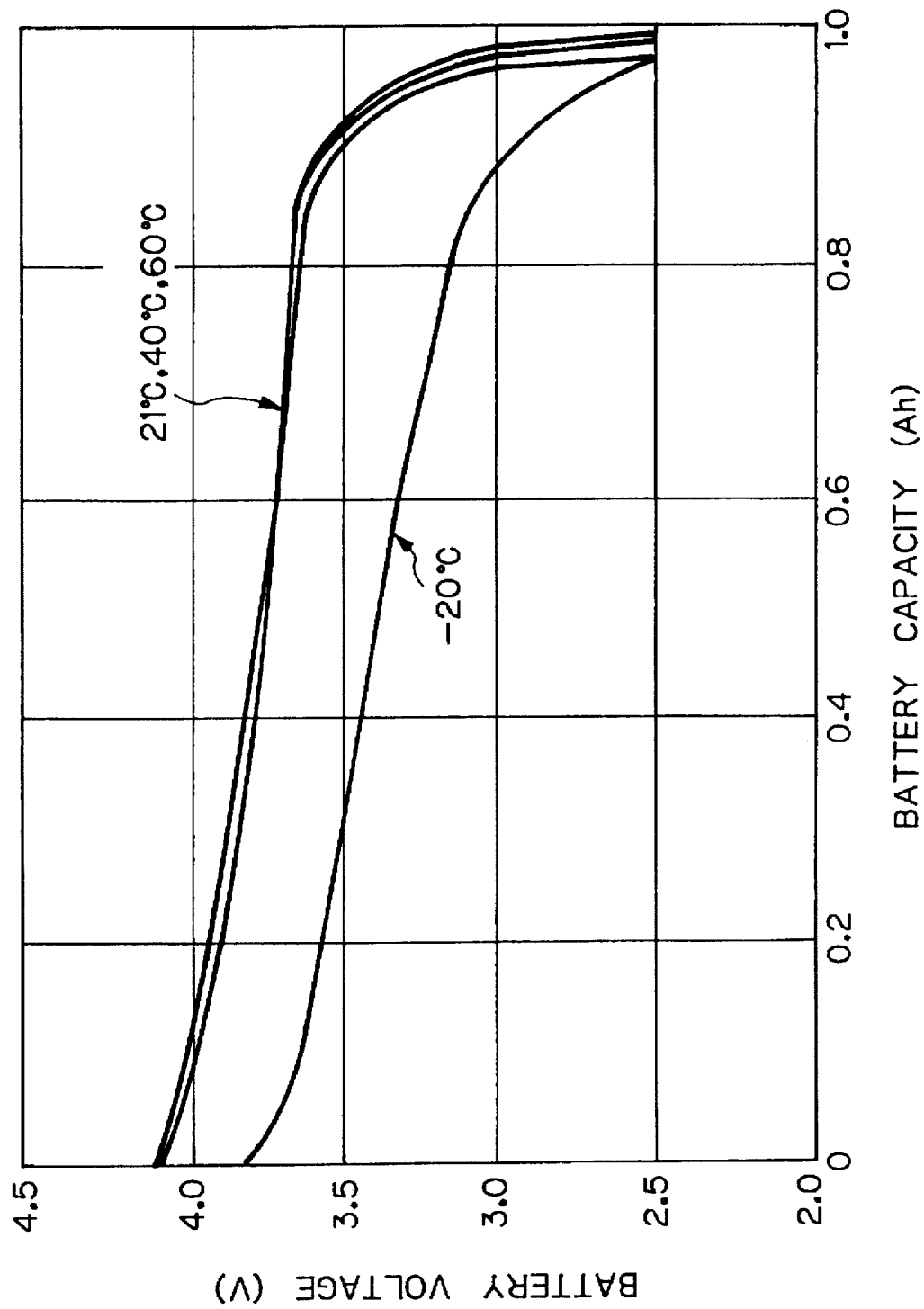
FIG. 3 is graph showing a discharge temperature characteristic particular to a lithium ion secondary battery.

FIG. 2 shows another conventional battery pack using a lithium ion secondary battery. As shown, the battery pack has a lithium ion secondary battery 81 and a protection 82 consisting of an overdischarge protecting circuit, an overcharge protecting circuit, and an overcurrent protecting circuit. However, the lithium ion battery 81 is susceptible to the ambient atmospheric temperature, i.e., its terminal voltage noticeably drops at low temperatures, as also stated earlier. FIG. 3 shows the discharge temperature characteristic of a lithium ion secondary battery specifically. As shown, the voltage of the battery is far lower at –20° C. than at 21° C., 40° C. and 60° C. Therefore, the output voltage of the above battery pack 81 drops at low temperatures. As a result, a portable apparatus loaded with the battery pack 81 cannot be powered by a constant voltage.

Figure 4:
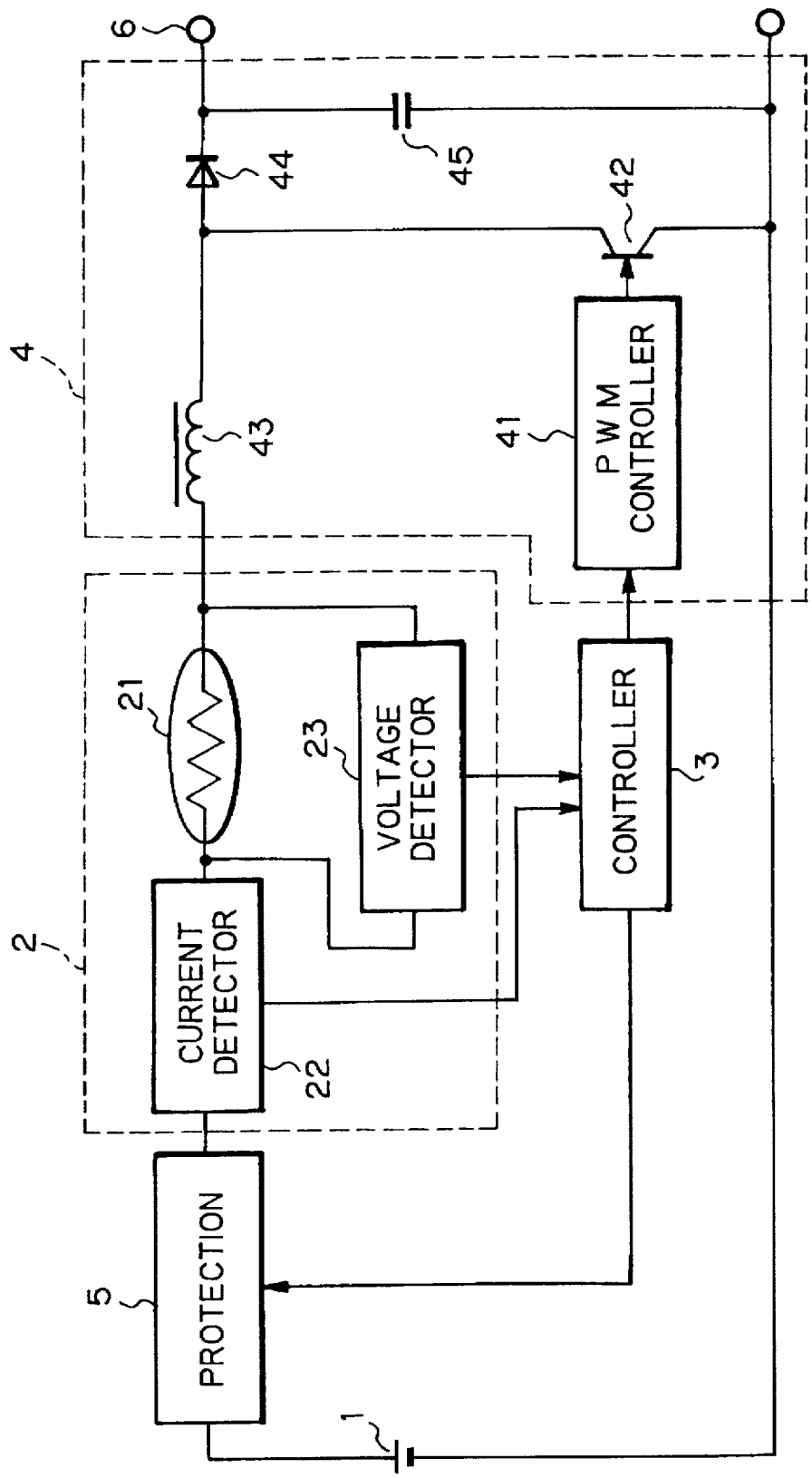
FIG. 4 is a block diagram schematically showing a battery pack embodying the present invention.

Referring to FIG. 4, a battery pack embodying the present invention will be described. As shown, the battery pack has a lithium ion secondary battery 1. A temperature sensing circuit 2 is responsive to temperature around the battery pack. A controller 3 controls the boosting ratio in response to a signal output from the temperature sensing circuit 2. A boosting circuit 4 boosts a voltage in response to a control signal fed from the controller 3, as will be described specifically later. There are also shown in FIG. 4 a protection 5 consisting of an overcurrent protecting circuit, an overcharge protecting circuit, and an over-discharge protecting circuit, and an output terminal 6.

The temperature sensing circuit 2 has a thermistor 21, a current detector 22 for detecting a current flowing through the thermistor 21, and a voltage detector 23 for detecting the voltage across the thermistor 21. The discharge temperature characteristic of the secondary battery 1 is stored in the controller 3 beforehand. The controller 3 computes a temperature based on the outputs of the current detector 22 and voltage detector 23, computes a voltage based on the computed temperature, and then computes a boosting ratio setting up a preselected voltage. The boosting circuit 4 is a PWM (Pulse Width Modulation) control type switching regulator consisting of a PWM controller 41, a semiconductor switching device 42, an inductor 43, a diode 44, and a capacitor 45.

In operation, the resistance of the thermistor 21 varies with the varying ambient atmospheric temperature. As a result, the current and voltage of the thermistor 21 vary. The current detector 22 and voltage detector 23 send their outputs respectively representative of the above current and voltage to the controller 3. In response, the controller 3 computes the temperature around the battery pack and then determines a boosting ratio by referencing the discharge temperature characteristic of the lithium ion battery 1 stored therein.

Specifically, assume that the lithium ion battery 1 has the discharge temperature characteristic shown in FIG. 3, and that the temperature is about −20° C. Then, the controller 3 feeds a control signal to the boosting circuit 4 to cause it to raise the output voltage by about 0.4 V which is the difference between the voltage at, e.g., 21° C. and the voltage at −20° C. In response, the boosting circuit 41 causes its PWM controller 41 to control the ON/OFF time ratio of the switching device 42, thereby raising the voltage. At the same time, the controller 3 delivers a control signal to the protection 5. In response, the protection 5 lowers its overdischarge protection voltage by the value raised by the boosting circuit 4. As a result, a preselected voltage expected to appear at normal temperatures successfully appears on the output terminal despite the low temperature around the battery pack.

In summary, it will be seen that the present invention provides a battery pack using a lithium ion secondary battery and capable of adjusting the output voltage when temperature around the battery pack is low and causes the voltage of the battery to drop. Therefore, the battery pack outputs a constant voltage on its output terminal without regard to the ambient atmospheric temperature.

Various modifications will become possible for those skilled in the art after receiving the teachings of the present disclosure without departing from the scope thereof.

What is claimed is:

1. A battery pack using a lithium ion secondary battery, comprising:
   a protection circuit consisting of an overdischarge protecting circuit, an overcharge protecting circuit, and an overcurrent protecting circuit;
   a temperature sensing circuit consisting of a temperature non-linear element, a current detector, and a voltage detector;
   a controller for controlling a boosting ratio in response to an output of said temperature sensing circuit; and
   a boosting circuit for boosting an output voltage of said lithium ion secondary battery in response to a control signal output from said controller.

2. A battery pack as claimed in claim 1, wherein said temperature non-linear element comprises a thermistor.

3. A battery pack as claimed in claim 1, wherein said control signal feeds a control circuit to said overdischarge protection circuit in order to control an overdischarge protection voltage of said overdischarge protection circuit.

4. A battery pack comprising:
   a lithium ion battery;
   a temperature sensing circuit;
   a boosting circuit for boosting the output of the battery;
   a controller responsive to signals output from the temperature sensing circuit to control the boosting circuit.

5. The battery pack of claim 4, further comprising:
   a protection circuit responsive to the controller to protect the battery.

6. The battery pack of claim 4, wherein said battery circuit comprises a pulse width modulation controller and a switching element.

* * * * *